US012786122B2

(12) United States Patent
Woodworth et al.

(10) Patent No.: US 12,786,122 B2
(45) Date of Patent: Nov. 3, 2026

(54) SYSTEMS AND METHODS FOR MANAGING PAIRED CONNECTIONS

(71) Applicant: CenturyLink Intellectual Property LLC, Denver, CO (US)

(72) Inventors: John R.B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 45 days.

(21) Appl. No.: 18/960,660

(22) Filed: Nov. 26, 2024

(65) Prior Publication Data

US 2025/0184270 A1 Jun. 5, 2025

Related U.S. Application Data

(60) Provisional application No. 63/605,844, filed on Dec. 4, 2023.

(51) Int. Cl.

| | |
|---|---|
| ***G06F 15/16*** | (2006.01) |
| ***G06F 9/54*** | (2006.01) |
| ***H04L 29/06*** | (2006.01) |
| ***H04L 45/745*** | (2022.01) |
| ***H04L 61/10*** | (2022.01) |

(52) U.S. Cl.

CPC ............ *H04L 45/745* (2013.01); *H04L 61/10* (2013.01)

(58) Field of Classification Search

CPC ... H04L 45/745; H04L 61/10; H04L 61/5038; H04L 2101/622

USPC .......................................................... 709/228

See application file for complete search history.

(56) References Cited

U.S. PATENT DOCUMENTS

| | | | | |
|---|---|---|---|---|
| 9,106,307 | B2 * | 8/2015 | Molettiere | A61B 5/0022 |
| 9,226,101 | B1 * | 12/2015 | Ludwig | H04M 3/42348 |
| 11,985,458 | B2 * | 5/2024 | Goh | H04W 84/18 |
| 12,363,465 | B2 * | 7/2025 | Goh | H04W 84/18 |
| 2005/0278646 | A1 * | 12/2005 | Liscano | H04L 67/303 717/100 |
| 2012/0238216 | A1 * | 9/2012 | Hallowell | H04W 84/18 455/41.3 |
| 2012/0322376 | A1 * | 12/2012 | Couse | H04M 1/72412 455/41.2 |
| 2014/0235171 | A1 * | 8/2014 | Molettiere | A61B 5/486 455/41.2 |
| 2015/0217191 | A1 * | 8/2015 | Yan | A63F 13/235 463/37 |
| 2015/0351142 | A1 * | 12/2015 | Seymour | H04R 25/554 455/41.3 |

(Continued)

FOREIGN PATENT DOCUMENTS

KR 101528466 B1 * 6/2015 ............ H04W 76/10

*Primary Examiner* — Hamza N Algibhah

(57) ABSTRACT

Systems and methods are provided for managing paired connections. A conductor system may receive a request to connect a first managed device to a second managed device using a first protocol; determine that the first managed device is currently connected to a third managed device via a current connection using the first protocol; determine a first portable media access control (MAC) address used by the third managed device for the current connection to the first managed device; and cause the first portable MAC address to be transferred from the third managed device to the second managed device.

18 Claims, 4 Drawing Sheets

(56) References Cited

U.S. PATENT DOCUMENTS

| | | | | |
|---|---|---|---|---|
| 2016/0149749 | A1* | 5/2016 | Bunker | H04L 67/141 709/217 |
| 2016/0360341 | A1* | 12/2016 | Srivatsa | H04M 1/72412 |
| 2017/0005820 | A1* | 1/2017 | Zimmerman | G05B 15/02 |
| 2017/0303326 | A1* | 10/2017 | Kwon | H04W 8/005 |
| 2019/0394519 | A1* | 12/2019 | Yamakawa | H04N 21/8455 |
| 2023/0353917 | A1* | 11/2023 | Goh | H04R 1/00 |
| 2025/0271507 | A1* | 8/2025 | Van Straalen | H02M 7/49 |
| 2026/0064335 | A1* | 3/2026 | Yano | G06F 3/1231 |

* cited by examiner

SYSTEMS AND METHODS FOR MANAGING PAIRED CONNECTIONS

CROSS-REFERENCE TO RELATED APPLICATIONS

This application claims the benefit of U.S. Provisional Application No. 63/605,844 filed Dec. 4, 2023, entitled "Systems and Methods for Managing Paired Connections," which is incorporated herein by reference in its entirety.

BACKGROUND

A variety of electronic devices are capable of establishing paired wireless connections with other devices for receiving and/or providing services. For example, two or more devices may be capable of pairing with one another via a short-range wireless technology standard, such as Bluetooth®, in which data may be exchanged between the paired devices according to a protocol. During the pairing process, the devices may automatically indicate to each other the type of service being offered and/or the intended function of the connection being established. A user of the devices may control which of a plurality of pairable devices should be used for providing particular services. For instance, a user may choose whether to pair a smartphone with a set of wireless headphones or with a home stereo receiver for providing playback of streamed music content. During operation, the user may wish to change which devices are paired for exchanging services.

It is with respect to this general technical environment that aspects of the present technology disclosed herein have been contemplated. Furthermore, although a general environment is discussed, it should be understood that the examples described herein should not be limited to the general environment identified herein.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description, or may be learned by practice of the disclosure.

In an aspect, the present application recites a method, comprising: receiving, at a conductor system, a request to connect a first managed device to a second managed device using a first protocol; determining, by the conductor system, that the first managed device is currently connected to a third managed device via a current connection using the first protocol; determining a first portable media access control (MAC) address used by the third managed device for the current connection to the first managed device; and causing, by the conductor system, the first portable MAC address to be transferred from the third managed device to the second managed device.

In another aspect, the present application discloses another method, comprising: establishing, by a conductor system, communication with each of a first managed device, a second managed device, and third managed device using a first protocol; receiving, by the conductor system, registration of the first, second and third managed devices for pairing management; receiving, at the conductor system, a request to connect the first managed device with the third managed device; obtaining at least one portable MAC address for the third managed device; causing the first managed device to pair with the third device using the at least one portable MAC address, wherein pairing is performed according to a second protocol that is different from the first protocol; receiving, at a conductor system, a request to connect the first managed device to the second managed device; and causing, by the conductor system, the first portable MAC address to be transferred from the third managed device to the second managed device.

In another aspect, the present application discloses a system, comprising: at least one processor; and memory, operatively connected to the at least one processor and storing instructions that, when executed by the at least one processor, cause the system to perform a method. In an aspect, the method comprises: receiving, at a conductor system, a request to connect a first managed device to second managed device using a first protocol; determining, by the conductor system, that the first managed device is currently connected to a third managed device via a current connection using the first protocol; determining a first portable media access control (MAC) address used by the third managed device for the current connection to the first managed device; and causing, by the conductor system, the first portable MAC address to be transferred from the third managed device to the second managed device.

BRIEF DESCRIPTION OF THE DRAWINGS

The following drawing figures, which form a part of this application, are illustrative of aspects of systems and methods described below and are not meant to limit the scope of the disclosure in any manner, which scope shall be based on the claims.

DETAILED DESCRIPTION

Figure 1:
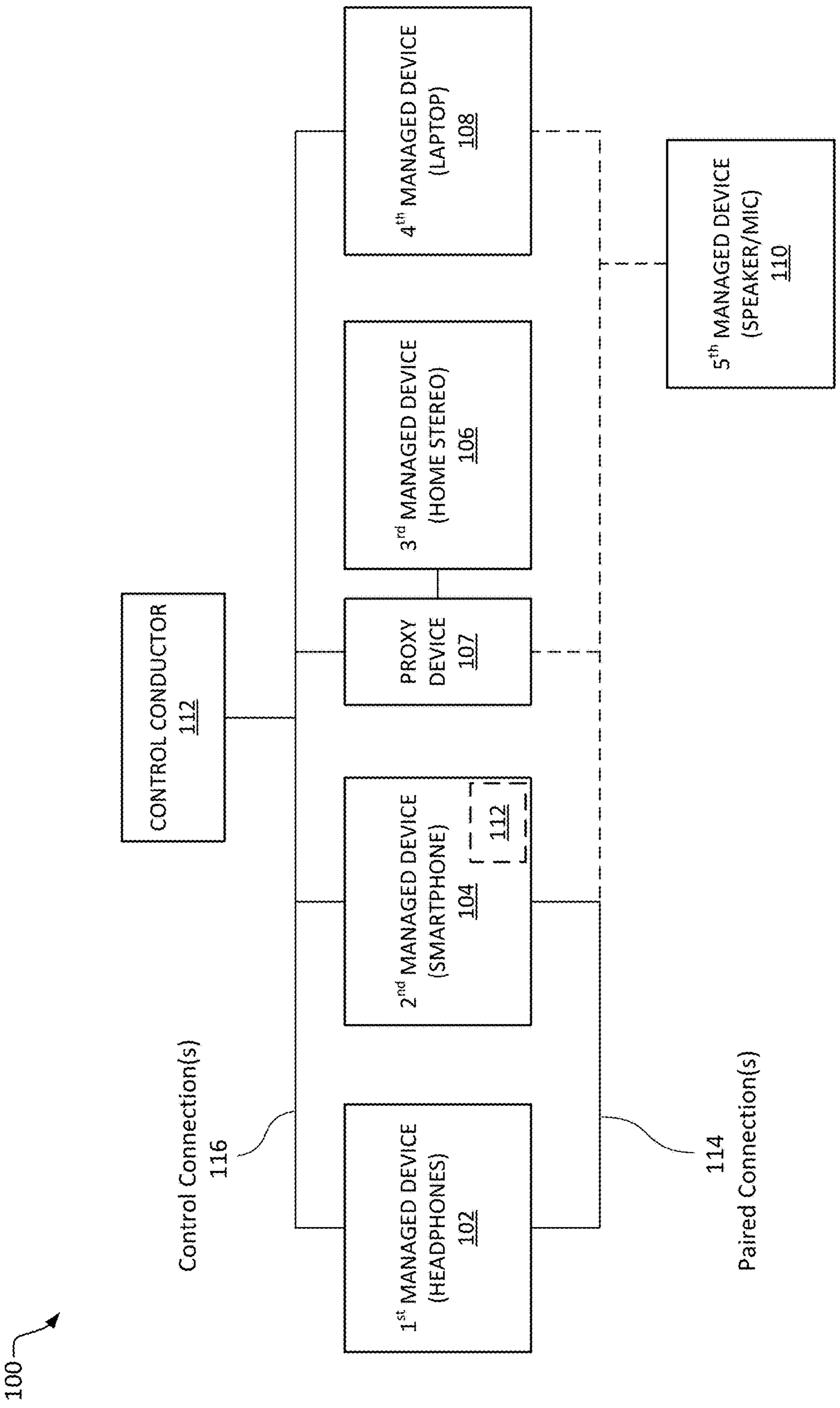
FIG. 1 is a block diagram of an example wireless device pairing environment.

An increasing number of electronic devices are capable of establishing paired wireless connections for receiving and/or providing services. These devices may be capable of pairing with one another via a short-range wireless technology standard, such as the Bluetooth standard, in which data may be securely exchanged between the paired devices according to one or more protocols of the standard. The types of devices capable of forming paired connections may include portable devices (e.g., tablets, headphones, smartphones, laptops, etc.), along with a variety of other types of devices (e.g., home stereos, smart speaker systems, desktop computers, printers, etc.).

According to some wireless pairing protocols, when two devices establish a paired connection, the devices may exchange device-identifying information so that the devices may identify data received and intended for one another. For example, the pairing protocol may require that the devices exchange media access control (MAC) addresses, Bluetooth device addresses (BD_ADDRs), or other device-identifying information. In addition, when pairing or just prior to pairing, the devices may specify what services each device supports, and the pairing protocol may include specifications that define how the services are offered and provided between the devices. These service specifications may be referred to as profiles. Devices that support the same profiles may pair and exchange services per the specifications of the protocol. For instance, a smartphone and a set of wireless headphones may both support an audio streaming profile, such as the advanced audio distribution profile (A2DP) profile provided by the Bluetooth protocol. Both the headphones and smartphone may indicate support for the A2DP profile during pairing. Conversely, devices that support different, non-compatible profiles may be incapable of pairing. For example, the headphones may not support profiles that are compatible with the profiles supported by a printer, and therefore the headphones and printer may not be able to pair.

In general, a device may support a plurality of profiles. Returning to the above example, the headphones may include a microphone and control inputs that allow the headphones to transmit remote control signals (e.g., volume control, fast forward, pause, etc.), receive telephone calls, and provide other features or functions, in addition to receiving an audio stream from the smartphone. Both the headphones and smartphone may indicate support for the profiles associated with these features/functions during pairing, and when paired, may provide these services to each other.

Further, a device may be configured to provide a unique MAC address, BD_ADDR, or other type of identifier for each profile or subset of profiles supported by the device. When pairing, each device may provide the MAC address corresponding to the services (profiles) being offered to the other device. For example, a first device may provide a first MAC address for a first subset of profiles when pairing with a second device, and the first device may provide a second MAC address for a second subset of profiles when pairing with a third device.

In addition to exchanging MAC addresses (or other device-identifying information), devices being paired may exchange security credentials intended to secure the information/data being exchanged between the paired devices. The security credentials may include one or more security keys, tokens, authentication information, or other types of security credentials that may be used by the paired devices to authenticate data received through the paired connection.

Once paired, the devices may provide secure and reliable service to the user via the wireless technology standard. However, because of the wide availability of devices capable of forming paired connections, it is common for users to unpair devices from one another and subsequently pair one or both of the devices with still other devices. For many types of devices, pairing changes may be troublesome. For instance, a user may encounter a number of difficulties when changing the pairing of a first device from a second device to a third device, then changing the pairing of the first device back to the second device. In examples, some devices may have difficulty unpairing from other devices, which may necessitate powering down or rebooting one or both devices, or temporarily disabling the wireless feature of one or both devices, in order to unpair the two devices. In other examples, some devices may require the user to press a button in order to initiate pairing with a new device, in addition to other steps needed to complete pairing. These limitations increase the time spent by the user reconfiguring pairing and negatively impact the user experience.

As described herein, the present technology may reduce the difficulties experienced during device pairing changes and facilitate pairing between devices by introducing a control conductor to manage pairing. The control conductor may be implemented as a software application operating on at least one of the devices or a separate device, where the device with the conductor software provides a display for viewing device pairing information and provides control inputs (such as a touch-sensitive display) for configuring device pairing. The present technology further includes the use of portable MAC addresses, which may be generated by each device or by the conductor. A portable MAC address is distinct from other built-in device-identifying information, such as a device's primary MAC address or BD_ADDR, and may be detached from a device and moved to another device as part of a pairing change. In examples where a first device becomes unresponsive, powers-off, or goes out of range, the conductor is capable of moving the portable MAC address to a second device in the pairing environment that supports the appropriate profile(s). Because the portable MAC address is distinct from a device's primary MAC address or BD_ADDR, the conductor may manage pairing between devices without creating a conflict for any one device, which may be using its primary MAC address and/or BD_ADDR for another purpose.

In addition, when a user requests a pairing change for a first device through the conductor, the change may appear seamless from the perspective of the first device, since the first device is connected to a second device using the portable MAC address, which is simply moved from the second device to a third device during a pairing change. This approach may reduce the time spent by the user managing device pairing and improve the overall pairing experience for the user. Further details are now provided by way of discussion of the included drawings.

FIG. 1 is a block diagram of an example wireless device pairing environment 100, which includes a first managed device 102, second managed device 104, third managed device 106, proxy device 107, fourth managed device 108, and fifth managed device 110 (collectively referred to herein as devices 102-110). The pairing environment 100 may represent a personal area network (PAN), Bluetooth piconet, or other arrangement or collection of devices capable of establishing paired connections. The devices 102-110 depicted in FIG. 1 are representative examples of electronic devices capable of forming paired wireless connections 114 according to a pairing protocol or set of protocols (e.g., Bluetooth protocol(s)), and capable of performing the functions and methods of the present technology. Paired devices of devices 102-110 communicate with one another and provide data and services according to one or more device profiles via the paired connections 114. In other examples, the pairing environment 100 may include greater or fewer devices and may include any of a multitude of different devices, capable of paired connection through the pairing protocol(s), but which may offer different services and/or perform different functions than devices 102-110.

The first managed device 102 comprises a set of audio headphones, which may support one or more profiles associated with the provision of audio services. In examples where the first managed device 102 acts only as a receiving endpoint for streamed audio, the first managed device 102 may support one or more profiles associated with receiving and playing back audio data (e.g., A2DP). In other examples, the first managed device 102 may provide control inputs (e.g., push buttons), audio inputs (e.g., a microphone), and/or other features, and may support one or more profiles associated with more advanced audio services (e.g., Bluetooth profiles AVRCP, HFP, HSP, etc.). Due to size constraints commonly encountered with headphones, the first managed device 102 may not include an interface that allows the user to initiate and/or configure pairing with devices 104-110. Therefore, the first managed device 102 may rely on the device with which it is being paired to serve as a host/master of the paired connection 114. For instance, pairing between the first managed device 102 and second managed device 104 may be ordinarily initiated by the second managed device 104 (e.g., a smartphone), which may also be used to configure the paired connection 114, configure various features and functions of the first managed device 102, provide audio content for playback, and/or perform other functions supported by one or more of the device profiles. In other examples, the first managed device 102 may form a paired connection 114 with other devices 106-110 in the pairing environment 100.

In the depicted example of FIG. 1, the second managed device 104 comprises a smartphone, which may recognize and support a multitude of profiles for a wide range of services offered between devices in the pairing environment 100. For example, in addition to supporting a range of audio profiles (e.g., music streaming, telephony, etc.), the second managed device 104 may support profiles associated with printing devices (e.g., Bluetooth-enabled printers), personal healthcare devices (e.g., wearable health monitors), personal area networks (PANs), wireless remote devices (e.g., selfie-remotes), and/or other types of profiles. In addition, smartphones typically include a touchscreen interface, or other type of user interface (UI), that provides for more advanced types of user interaction, such as dragging and dropping graphical objects, text input, menu selection, and the like. Accordingly, in some examples, the second managed device 104 may serve as a host/master of a paired connection 114, and/or may be used to configure and manage the pairing of other devices in the pairing environment 100.

The third managed device 106, in this example, comprises a home stereo, such as a stereo receiver, audio/video receiver, home theatre receiver, or similar type of device. In some examples, the third managed device 106 may not be capable of wirelessly pairing with other devices in the pairing environment 100. For example, the third managed device 106 may not include a Bluetooth or similar type of wireless transceiver. As depicted in FIG. 1, the third managed device 106 may be connected to a proxy device 107, which is capable of forming wireless paired connections, and provides this capability to the third managed device 106. The proxy device 107 may be connected to the third managed device 106 by any of a variety of connection options, such as through an audio input, audio output, other type of analog connection, digital connection, and/or other type of connection. The third managed device 106 may send data to the proxy device 107 for transmission to a paired device and/or the proxy device 107 may send data received from the paired device to the third managed device 106. The proxy device 107 provides profile information, MAC addresses, and other information, and performs functions associated with the pairing protocol to enable the third managed device 106 to form a paired connection 114 with other devices in the pairing environment 100. In other examples, the third managed device 106 may itself be capable of forming paired connections, such that the proxy device 107 may not be included.

In examples, the proxy device 107 and/or third managed device 106 may provide a display and a UI for receiving user inputs. For instance, the proxy device 107 and/or third managed device 106 may provide a touchscreen interface, or other type of UI that provides for more advanced types of user interaction, such as dragging and dropping graphical objects, text input, menu selection, and the like. Accordingly, in some examples, the proxy device 107 and/or third managed device 106 may serve as a host/master of a paired connection 114, and/or may be used to configure and manage other devices in the pairing environment 100.

The fourth managed device 108, in this example, comprises a laptop or other type of computer, and similar to the second managed device 104, may be capable of supporting a wide range of device profiles and services. The fourth managed device may present a UI that provides for more advanced types of user interaction, such as those described above (e.g., dragging and dropping graphical objects, etc.). Accordingly, in some examples, the fourth managed device 108 may serve as a host/master of a paired connection 114, and/or may be used to configure and manage other devices in the pairing environment 100.

The fifth managed device 110, in this example, comprises an audio system that includes one or more speakers and microphones. For example, the fifth managed device 110 may comprise a smart speaker system, a second set of headphones, or a similar type of device. The fifth managed device 110 may include a display and/or a UI for enabling more advanced user interaction. In examples the fifth managed device 110 may respond to voice commands, which may allow the fifth managed device 110 to function as a host/master of a paired connection.

The pairing environment 100 includes at least one control conductor 112, which may control and configure (i.e., manage) pairing between the devices 102-110 for the exchange of services according to one or more device profiles. The conductor 112 may comprise executable software, such as a software application (app), firmware, algorithms, and/or other form of computer instructions installed and executed on one or more of the devices 102-110, and/or installed and executed on another device associated with the pairing environment 100. In examples, the conductor software may be included on a device capable of receiving user input for managing device pairing, and capable of displaying or otherwise communicating pairing and other information related to devices 102-110, such as which of devices 102-110 are paired, which are available for pairing, etc. For example, as nonexclusively depicted in FIG. 1, the conductor 112 may be instituted on a smartphone 104, which may include a touch-sensitive screen suitable for both displaying pairing information and receiving user input for managing device pairing.

Additionally or alternatively, the conductor 112 may be hosted or implemented on one or more other devices that provide for the display and/or management of aspects of device pairing. For instance, the conductor 112 may be included on laptop 108, which may include a display and control inputs suitable for allowing a user to view pairing information and manage device pairing. In other examples, both the smartphone 104 and laptop 108 (and/or additional devices) may each include an instance of the conductor 112 that allows the smartphone 104 and/or laptop 108 to function as a conductor 112. In examples where two or more of the devices 102-110 include an instance of the conductor 112, as described below, such devices may negotiate to determine which of the devices will serve as a conductor 112 for a profile or subset of profiles supported by the devices. In examples, each device may function as a conductor 112 for a different profile or subset of profiles, at the same time. In some examples, different instances of conductor 112 continually or periodically synchronize with each other to maintain consistent knowledge base among the conductor 112 instances with regard to active pairings and the assignment of portable MAC addresses used in such pairings.

The devices 102-110 (and, in some instances, the conductor 112) are capable of communicating according to a first wireless technology standard, such as Bluetooth or other wireless technology standard, and are further capable of establishing paired connections 114 according to one or more pairing protocols associated with the first wireless technology standard. The conductor 112 and devices 102-110 may also be capable of communicating according to a second wireless technology standard, such as WiFi or other type of wireless networking technology standard (e.g., control connections 116). The conductor 112 may manage pairing between devices 102-110 through control connections 116, which may be established through either the first wireless technology standard, second technology standard, or a combination thereof. In examples, the control connections 116 may be established via the paired connections 114.

In examples where the control connections 116 are established via the second wireless technology standard (e.g., WiFi), the pairing environment 100 may include devices or equipment associated with the second wireless technology standard. For example, the pairing environment 100 may include one or more servers, routers, switches, and/or other types of networking devices (not depicted in FIG. 1). Such devices/equipment may also be capable of functioning as a conductor 112. For example, the conductor 112 could be implemented on a router that also serves to enable a WiFi network among the devices 102-110 within pairing environment 100.

To enter a state in which the control conductor 112 manages pairing among the device 102-110, the conductor 112 and one or more of the devices 102-110 may perform a control registration process. To perform control registration, communication is established between the conductor 112 and one or more of the devices 102-110, such as through control connections 116 and/or paired connections 114. In some examples, the conductor 112 may pair with a device 102-110 being registered, and control registration may take place as part of the pairing process. In examples, the control registration process may be separate from other forms of device registration that may take place as part of a pairing protocol (e.g., device registration during Bluetooth pairing).

In examples, control registration is performed between one of the devices 102-110 configured to function as a conductor 112 and another of the devices 102-110 configured to allow pairing management by the conductor 112. In examples, one or more of the devices 102-110 may be configured to automatically perform control registration with a conductor 112 (if a conductor 112 is present in the pairing environment 100), such as by one or more device settings configured by the device manufacturer. For instance, the headphones 102, which in some examples may have minimal input controls, may be configured by the manufacturer to automatically perform control registration and allow pairing management by the conductor 112, if one of the remaining devices 104-110 is configured to function as a conductor 112. In this regard, the headphones 102 may be registered for pairing management with the conductor 112 with minimal, if any, input from a user.

Further, the headphones 102 may be configured to automatically establish communication and initiate control registration with the conductor 112 when the headphones 102 power-on, or at other times during operation. In examples, the headphones 102 may be configured to allow pairing management, but at power-on (or at other times) may be configured to perform control registration when initiated by the conductor 112. The conductor 112 may be configured to periodically search or scan the pairing environment 100 for devices configured to allow pairing management, or the conductor 112 may be configured to otherwise detect the presence of such a device in the pairing environment 100, and may initiate control registration when such a device is detected. In another example, the headphones 102 (or device with similar capabilities) may detect when a conductor 112 is present in the pairing environment 100, such as when the conductor 112 is powered on or becomes available, and may automatically initiate control registration with the conductor 112, or may solicit the conductor 112 to initiate control registration.

In some examples, one or more of the devices 102-110 may provide a setting or other type of control input through which the user may choose whether to allow the device 102-110 to perform control registration and allow pairing management by the control conductor 112. For instance, the smart speaker/mic 110 may provide a control setting through which the user may elect not to register for pairing management with the conductor 112. As depicted in FIG. 1, the speaker/mic 110 may still pair with any of the remaining devices 102-108, such as through normal pairing protocols of the pairing environment 100. However, the speaker/mic 110 may not establish a control connection 116 with the conductor 112 and may not participate in pairing management as described herein. Similarly, a device 102-110 not configured to allow pairing management may not be registered with the conductor 112, and/or may otherwise not participate in pairing management.

The process of control registration may include establishing and/or exchanging security credentials between the conductor 112 and any of the devices 102-110 being registered for pairing management. The security credentials may include one or more security keys, tokens, authentication information, or other types of security credentials that may be used by the conductor 112 and any of the devices 102-110 being registered to authenticate one another.

The process of control registration may further include exchanging primary MAC addresses, Bluetooth device addresses (BD_ADDRs), and/or other device-identifying information used for pairing management by the conductor 112. For example, the device-identifying information may be used for communication between the conductor 112 and the devices 102-110 being managed, such as through paired connections 114 and/or control connections 116. The conductor 112 may use the primary MAC address, BD_ADDR, or other device-identifying information temporarily, until a portable MAC address is generated or provided for communication between the conductor 112 and the device 102-110 being registered for pairing management.

Control registration also includes determining the profiles and services offered by the devices 102-110 that will be managed by the conductor 112. In some examples, the conductor 112 may be configured to manage device pairings for a defined subset of profiles provided within a pairing protocol. For instance, a conductor 112 may be configured to manage device pairings for certain types of audio profiles and may register one or more of the devices 102-110 that support those profiles. As one example, the proxy device 107 may be configured as a conductor 112 (on behalf of home stereo 106) and may register headphones 102, which may support a music streaming profile (e.g., A2DP), an audio remote control profile (e.g., AVRCP), and/or other types of profiles associated with paired audio devices. In another example, the proxy device 107 may not register a printer (not depicted in FIG. 1), since a device like the home stereo 106 may not perform functions associated with printed documents.

In addition, devices 102-110 configured to allow pairing management may only offer a subset or portion of supported profiles to be managed by a conductor 112, but may not offer other profiles for pairing management. For instance, the headphones 102 may be configured to register with a conductor 112 (e.g., proxy device 107) for pairing management of profiles associated with audio streaming, but may not register with the conductor 112 for pairing management of profiles associated with telephone functions. In examples, devices 102-110 may be configured to allow pairing management by a first conductor 112 for a first set of profiles, and pairing management by a second conductor 112 for a second set of profiles, different from the first set of profiles. In still other examples, devices 102-110 may be configured to allow pairing management of a first set of profiles by a conductor 112 and may not allow pairing management of a second set of profiles by any conductor 112. The devices 102-110 may allow the user to configure which profiles of the devices 102-110 may be managed by one or more conductors, and which profiles are not available for pairing management.

In some examples, control registration may be performed where two or more of the devices 102-110 may be configured as conductors 112, but for different subsets of profiles. For example, the smartphone 104 may be configured as a conductor 112 for devices that support wireless remote-control profiles (not depicted in FIG. 1) and may register the proxy device 107 for this purpose. The proxy device 107 may itself be a conductor 112 for devices that support audio streaming profiles. The registration of the proxy device 107 with the smartphone 104 may not affect the function of either the proxy device 107 or the smartphone 104 as conductors 112 of the profiles and device pairings managed by each.

In further examples, two of the devices 102-110 may be configured to be conductors 112 for paired devices that support the same, or an overlapping subset, of profiles. In such examples, the two devices may negotiate to determine which device will function as a sole conductor 112 for the subset of profiles or for individual device connections. For instance, the smartphone 104 and proxy device 107 may both be configured to manage profiles for streaming audio. During registration, the smartphone 104 and proxy device 107 may negotiate for status as the sole conductor 112 for devices that support streaming audio profiles. In one example, the negotiation may be settled according to a set of rules or criteria included as part of the conductor software. For example, the conductor 112 may be chosen based on device hardware performance, included features (e.g., presence of a touch-sensitive display), and/or other criteria. In other examples, the conductor 112 may be chosen by another method.

In still other examples, when two of the devices 102-110 are configured to be conductors 112 of the same profile or subset of profiles, the two devices may negotiate prior to, or outside of, the control registration process to determine which will be the sole conductor 112. For instance, two of the devices 102-110 configured to be the conductor 112 may detect one another via paired connections 114 or control connections 116, and may negotiate to determine the sole/single conductor 112 for the profiles in question. Any of the managed devices 102-110 that may already have registered for pairing management with a first conductor 112 may be transferred to the second conductor 112, based on the second conductor 112 being selected as the sole conductor 112 during negotiation. In some examples, devices 102-110 registered with a first conductor 112 may enter the control registration process again with the second conductor 112, if the second conductor 112 is selected to be the sole conductor 112. In other examples, devices 102-110 being managed by one of the conductors 112 may be transferred to the other conductor 112 using other methods.

With two or more of the devices 102-110 registered with the conductor 112, the conductor 112 may manage device pairing based on user input, according to the profiles registered by the devices. Management of device pairing may include receiving, at the conductor 112, a request from the user to pair one of the devices 102-110 with another of the devices 102-110, or to implement some other change to a current pairing arrangement. In examples, the conductor 112 may receive the request through a UI provided on a touch-sensitive display of the conductor 112. For example, the conductor 112 may provide graphical representations of the devices registered for pairing management on a UI and allow a user to drag-and-drop the graphical representation of one device to the graphical representation of the other device to indicate a pairing request. In other examples, the conductor 112 may receive other forms of input indicating a pairing request from the user, including audio input, gesture input, etc.

The conductor 112 may be configured to display all devices 102-110 that support a specific profile or set of profiles and that allow pairing management. The conductor 112 may provide a selection menu that allows the user to filter and display pairable devices based on the type of profile or set of profiles supported by those devices. For instance, the conductor 112 may provide a drop-down menu that lists the types of profiles and/or the functions associated with different profiles that are supported by devices for which the user may request pairing. In one example, the conductor 112 may provide a menu that includes menu items such as audio streaming, telephony, printing, remotes, and other types of profiles or functions. In examples where the user selects audio streaming from the menu, the conductor 112 may only display pairable devices registered with the conductor 112 as supporting audio streaming profiles, such as headphones 102, smartphone 104, home stereo 106, and laptop 108. The display may indicate that the headphones 102 are currently paired with the smartphone 104, and the user may request to change the pairing by dragging and dropping a graphical representation of the headphones 102 to a graphical representation of the home stereo 106, for example. In other examples, the conductor 112 may provide other types of selection features that allow a user to filter and display a subset of the devices 102-110 in a pairing environment 100, based on the supported profile(s).

In addition to displaying devices that are registered with the conductor 112 and that allow pairing management, the conductor 112 may also display, or may provide an option to display, a subset of devices 102-110 that are not registered with the conductor 112 or are otherwise not configured to allow pairing management by the conductor 112. In some examples, the user may elect to register and/or enable pairing management for one or more of the devices 102-110 that are not currently registered and/or enabled for pairing management, such as through the UI provided by the conductor 112. For instance, the UI may allow the user to tap on the graphical representation of an unregistered device to initiate registration and/or enable pairing management. In other examples, the unregistered device may be registered for pairing management through another method provided by conductor 112, or through the unregistered device itself.

The conductor 112 may receive a pairing request associated with two or more of the devices 102-110, where the conductor 112 acts as a pairing manager but is itself is not one of the devices 102-110 being paired. For example, smartphone 104 may act as a conductor 112 for an audio streaming profile for which only the headphones 102, proxy device 107 (on behalf of home stereo 106), and laptop 108 are registered with the conductor 112. The headphones 102 may currently be paired with the proxy device 107, and the conductor 112 may receive a request to instead pair the headphones 102 with the laptop 108, such as by the user dragging and dropping a graphical representation of the headphones 102 from a graphical representation of the proxy device 107 (or home stereo 106) to a graphical representation of the laptop 108. While in this example the smartphone 104 itself is not configured to support the audio streaming profile associated with the headphones 102, the smartphone 104, acting as a conductor 112, may manage the pairing request. Other devices 102-110 acting as a conductor 112 may similarly manage pairings for profiles not supported by the device acting as a conductor 112.

In examples, initiation of a pairing request by the user may cause each of the devices 102-110 associated with the pairing request to generate one or more portable MAC addresses that may be used to facilitate pairing. A portable MAC address may be randomly generated by each device and/or may be generated according to an established method. For example, a portion of the portable MAC address generated by one of the devices 102-110 may be based on the device's primary MAC address, such as a portion of the MAC address associated with the device's network interface card (NIC). In other examples, the portable MAC address may be based on a portion of the device's Bluetooth address (BD_ADDR), or other address information associated with the pairing protocol supported by the pairing environment 100. In still other examples, portions of the portable MAC address generated by a device may be based on device- or manufacturer-specific information, such as the device's organizationally unique identifier (OUI) or similar device- or manufacturer-specific identifier. In other examples, the portable MAC address may be generated randomly and not be specific to any particular device.

In some examples, initiation of a pairing request by the user may cause the conductor 112 to generate one or more portable MAC addresses on behalf of one or more of the devices 102-110 associated with the pairing request. For instance, a device may be incapable of generating portable MAC addresses or may be configured to request a portable MAC address from the conductor 112. The device may request a portable MAC address from the conductor 112, e.g., via control connections 116, or may indicate a preference for the conductor 112 to generate the portable MAC address(es) during control registration. The conductor 112 may generate the portable MAC address as described above, such as randomly, or according to an established method. For instance, the conductor 112 may generate a portable MAC address for a device based on device- or manufacturer-specific information that may have been communicated to the conductor 112, such as during control registration or at other times. The conductor 112 may provide one or more portable MAC addresses generated for one or more of the devices 102-110 via pairing connections 114 and/or control connections 116.

One or more of the devices 102-110 associated with a pairing request, or the conductor 112, may generate more than one portable MAC addresses as part of the pairing request. For example, one or more of the devices 102-110 may support two or more profiles and a portable MAC address may be generated for each of the supported profiles. In some examples, two or more portable MAC addresses may be generated for each supported profile.

As described above, in some examples, one or more portable MAC addresses may be generated by one or more of the devices 102-110, or by the conductor 112, in response to a pairing request. For instance, when the conductor 112 receives the pairing request from the user, the conductor 112 may instruct the devices 102-110 associated with the pairing request to generate one or more portable MAC addresses that may be used for pairing management, or the conductor 112 may request that each of the devices 102-110 associated with the pairing request provide a portable MAC address. In other examples, portable MAC addresses may be generated during control registration, or at other times during operation of the devices 102-110. Portable MAC addresses may be generated by software or firmware included with each device 102-110 or conductor 112, or in some examples, may be generated by electronic elements associated with each of the devices 102-110 (e.g., digital circuit or similar elements).

When the conductor 112 receives a pairing request, the conductor 112 may obtain and use the portable MAC addresses to facilitate pairing. As described above, the conductor 112 may request a portable MAC address from each of the devices 102-110 associated with a pairing request or may generate a portable MAC address on behalf of one or more of the devices 102-110. In some examples, when a pairing request is received, the conductor 112 may access portable MAC addresses stored by the conductor 112 for one or more of the devices 102-110 associated with the pairing request. For example, conductor 112 may access stored portable MAC addresses that are stored in a memory structure of the conductor 112 (or the device hosting the conductor 112) or in another memory structure accessible by the device hosting the conductor 112, such as a memory structure located in another computing device, in the cloud, or elsewhere. In examples, the conductor 112 may access stored portable MAC addresses that are provided during control registration, that were used in previous pairings by one or more of the devices 102-110, or that were otherwise stored by the conductor 112.

In accordance with the pairing request, the conductor 112 may provide the portable MAC address from one of the devices 102-110 being paired to another of the devices 102-110 being paired (and vice versa), such as through paired connections 114 or control connections 116. In other examples, rather than the conductor 112 handling the exchange of portable MAC addresses, the conductor 112 may instruct the devices 102-110 being paired to exchange portable MAC addresses directly with each other, such as through pairing connections 114.

Having exchanged portable MAC addresses, the devices 102-110 being paired may further complete the pairing operation according to the pairing protocol. The devices 102-110 being paired may exchange security credentials as described above. When completed, the security credentials may be shared with the conductor 112, which may securely store the security credentials for further use. For example, the conductor 112 may store the security credentials in a memory structure provided within the conductor 112, provided by another computing device, and/or provided in the cloud.

During operation, the user may wish to unpair devices 102-110 that were previously paired and form a new pairing. For example, the headphones 102 may be initially paired with home stereo 106 (via proxy deice 107) for streaming audio services, as coordinated through smartphone 104 acting as a conductor 112. The pairing includes exchanging portable MAC addresses, where the conductor 112 or headphones 102 provides a first portable MAC address to the proxy device 107, and the conductor 112 or proxy device 107 provides a second portable MAC address to the headphones 102. The portable MAC addresses are used by the headphones 102 and proxy device 107 to exchange services via the pairing protocol, as previously described. In examples where the portable MAC addresses are generated by the devices (102, 107), the portable MAC addresses may be reported to the conductor 112, e.g., by the control connection(s) 116.

The user may use the conductor software (e.g., a conductor app) on the smartphone 104 to initiate a pairing change, such as requesting that the headphones 102 be unpaired from the home stereo 106 and instead paired with laptop 108. As described above, the user may provide the pairing request by dragging and dropping graphical representations of the devices 102, 106, and/or 108 within the UI, or may provide the pairing request by another method. Rather than performing an unpairing operation followed by a new pairing operation, the conductor 112 may instead provide the first portable MAC address (generated by the headphones 102) to the laptop 108, so that the laptop 108 may use the first portable MAC address of the headphones 102 as an endpoint for directing streaming audio. However, instead of providing a new portable MAC address for the laptop 108 to the headphones 102, the conductor 112 may transfer the second portable MAC address (previously used by the proxy device 107) to the laptop 108. In this example, the proxy device 107 ceases use of the second portable MAC address until otherwise instructed by the conductor 112.

In addition to transferring the second portable MAC address to the laptop 108, the conductor 112 may also transfer any necessary security credentials from the proxy device 107 to the laptop 108. Thus, the headphone 102 and laptop 108 may continue to use the same security credentials that were established between the headphones 102 and proxy device 107. In this regard, the headphones 102 may continue to receive audio streaming services from the laptop 108 with little or no interruption, and the headphones 102 may not perceive any change in pairing because it is still communicating with the same (second) portable MAC address previously used by the proxy device 107. That is, from the perspective of the headphones 102, the connection to the endpoint of the second portable MAC address is unchanged.

With the home stereo 106 unpaired from the headphones 102, the home stereo 106 (through proxy device 107) is available to be paired with another of the devices 102-110 for providing or receiving audio streaming (or other) services. Since the portable MAC address that was generated by the proxy device 107 is now in use by the laptop 108, the proxy device 107 may automatically generate a new (third) portable MAC address, may generate a new portable MAC address upon receipt of a new pairing request, may request a new portable MAC address from the conductor 112, or may wait to generate/obtain a new portable MAC address. In other examples, the connection to the headphones 102 may be eventually transferred back to the proxy device 107 (e.g., through a UI command or otherwise), and the second portable MAC address may be transferred by the conductor 102 back to the proxy device 107 from the laptop 108. In some examples, when needed, the proxy device 107 may use another pre-assigned portable MAC address, such as a pre-assigned portable MAC address included with the proxy device 107 by the manufacturer and stored in a memory structure of the proxy devices 107.

In examples, when the laptop 108 is unpaired from the headphones 102, the conductor 112 may continue to associate the second portable MAC address (originally generated by the proxy device 107) with the laptop 108. In other examples, the conductor 112 may return the second portable MAC address to the proxy device 107 or transfer it again to yet a different device, such as speaker/microphone 110. If a new pairing with the laptop 108 for streaming audio services is requested, the conductor 112 or laptop 108 may use a portable MAC address generated by the laptop 108 for the new pairing request.

In some examples, while the laptop 108 is paired with the headphones 102, another pairing request may be received from the user to pair the headphones 102 with the smartphone 104. The conductor 112 may again transfer the second portable MAC address (generated by the proxy device 107) and security credentials from the laptop 108 to smartphone 104, for providing audio streaming services to the headphones 102.

In additional examples, the user may choose to use another of the devices 102-110 as a conductor 112, rather than the smartphone 104. The user may provide input through the conductor software indicating which of the devices 102-110 should function as a conductor 112. In such examples, pairings being managed by the current conductor 112 may be transferred to an instance of the conductor 112 operating on a selected one of the other devices 102-110. For instance, portable MAC addresses, security credentials, and/or other information associated with pairing management that may be stored or otherwise accessed by the current conductor 112 (the smartphone 104) may be transferred to another conductor 112 (e.g., hosted on the laptop 108). In some examples, the user may choose one of the devices 102-110 to host the conductor 112 for one set of services/profiles, but may move pairing management of another set of services/profiles to a second instance of a conductor 112. Accordingly, portable MAC addresses, security credentials, etc., associated with the services/profiles being moved from the first conductor 112 are transferred to the second conductor 112.

In still other examples, during operation, one or more of the paired devices 102-110 may be powered-off, taken out of pairing range, or otherwise made unavailable for exchanging services. The conductor 112 may provide the portable MAC address and security/authentication information to one of the other devices 102-110 that supports the device profile. As an example, the headphones 102 may be paired with the laptop 108 for receiving streaming audio services. The headphones 102 may be taken out of pairing range or powered-off. The conductor 112 (e.g., smartphone 104) may automatically transfer the portable MAC address and security credentials previously used by the headphones 102 to the proxy device 107, so that the laptop 108 may provide streaming audio service to the home stereo 106. In some examples, the conductor 112 may keep the portable MAC address and security credentials available for use by the headphones 102, should the headphones 102 move back into pairing range or be powered on. In other examples, the conductor 112 may discontinue use of the portable MAC address associated with the headphones 102 and/or may generate a new portable MAC address to use for pairing management.

In examples, two of the devices 102-110 may pair with one another via the pairing protocol in use in the pairing environment 100 (e.g., via Bluetooth pairing protocols) outside of the presence of a conductor 112. For instance, the proxy device 107 may pair with the headphones 102 for providing audio streaming services from the home stereo 106 to the headphones 102, while the device hosting the conductor 112 (e.g., the smartphone 104) is powered off, out of pairing range, or otherwise unavailable for pairing management. The headphones 102 and proxy device 107 may pair with one another through pairing connections 114 using the pairing protocols of the pairing environment 100. Following pairing, the conductor 112 may become available for pairing management. If the headphones 102 and proxy device 107 are configured to allow pairing management, the headphones 102 and proxy device 107 may generate and/or provide portable MAC addresses to the conductor 112 and may transfer or provide security credentials to the conductor 112. The conductor 112 may use the portable MAC addresses and security credentials to manage future pairing changes. In some examples, in the absence of a conductor 112, the devices 102-110 may be configured to generate and/or provide portable MAC addresses as part of the pairing process. When the conductor 112 becomes available, the portable MAC addresses and security/authentication information may then be provided to the conductor 112 for pairing management.

The present technology may also provide for rules-based pairing management by the conductor 112. For example, the conductor 112 may automatically transfer pairing from one of the devices 102-110 to another based on one or more pairing rules that may be configured by the user. The pairing rules may be based on the time of day (e.g., morning, midday, night, etc.), the location of the device hosting the conductor 112 and one or more of the devices 102-110 (e.g., at home, at work, etc.), the proximity of the device hosting the conductor 112 and/or one or more of the devices 102-110 to one another (e.g., closeness of the devices to one another), availability of the device hosting the conductor 112 and/or one or more of the devices 102-110 (e.g., powered-on, in range, etc.).

In one example, the user may configure the conductor 112 to automatically pair the smartphone 104 with a bedroom-based speaker system (e.g., speaker/mic 110) at a certain time of day, such as early in the morning, for streaming audio from the smartphone 104 to the speaker/mic 110. As a further example, the user may configure the conductor 112 to automatically transfer the portable MAC address (and security/authentication information) of the speaker/mic 110 to the proxy device 107 when the smartphone 104 is detected in proximity to proxy device 107, such as when the user transitions from the bedroom (e.g., not in range of the proxy device 107) to the living room (e.g., in range of the proxy device 107). As a result of the transfer, the user may continue listening to an audio stream on the home stereo 106.

In yet another example, the user may configure the conductor 112 by setting rules for pairing management associated with particular types of service and/or service demands. For example, the smartphone 104 may be paired with the proxy device 107 for providing a range of audio services to the home stereo 106. However, the user may configure the conductor 112 to automatically prevent audio content associated with a phone call received on the smartphone 104 from being broadcast on the home stereo 106.

Figure 2:
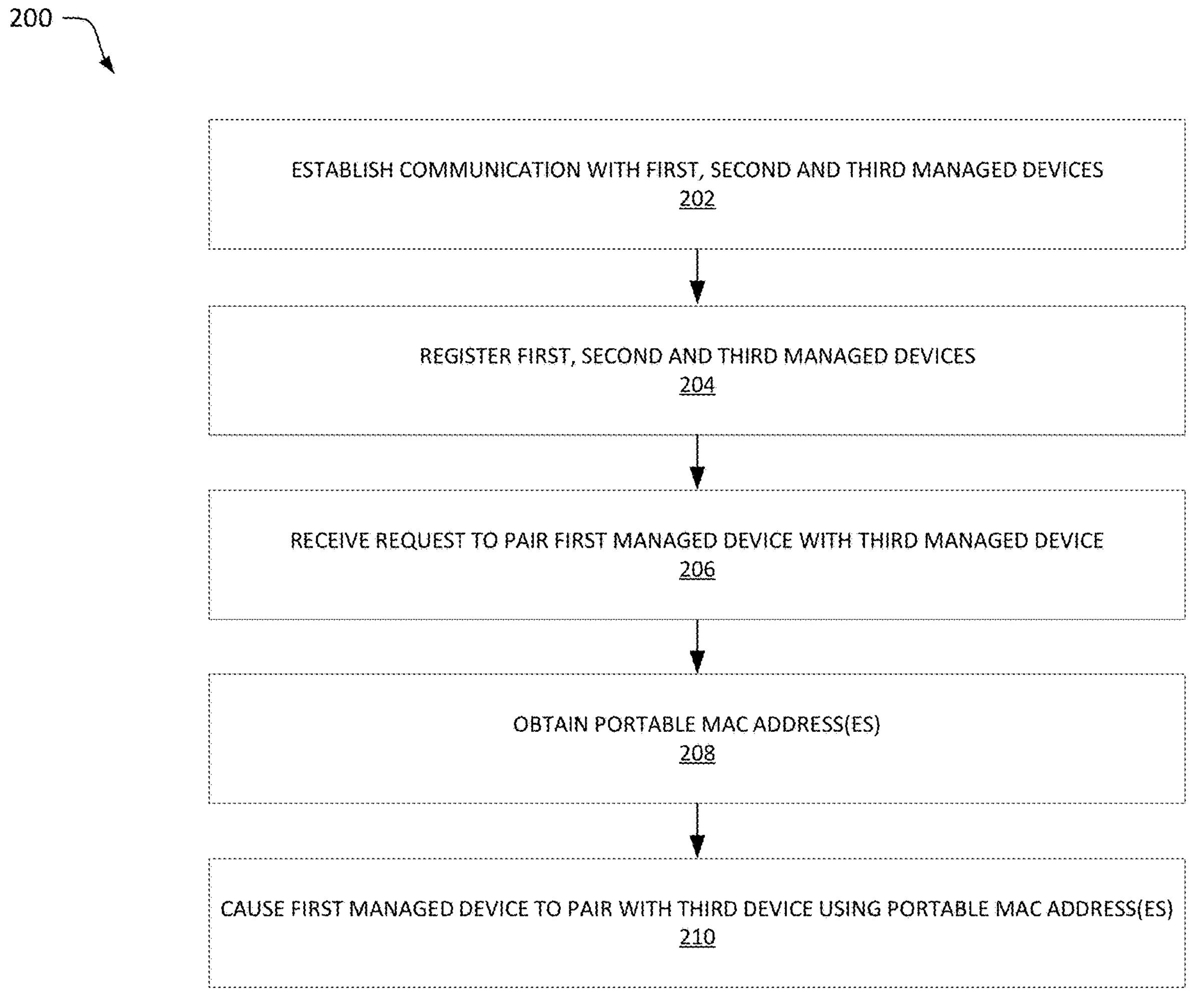
FIG. 2 depicts an example method in which aspects of the present technology may be performed by a conductor system.

FIG. 2 depicts an example method 200. In examples, the method 200 may be performed by a conductor system for registering devices for pairing management, and for establishing a paired connection between two of the managed devices. The example method 200 may be performed within a pairing environment (e.g., pairing environment 100) that includes a first managed device, second managed device, third managed device and a conductor system. The first, second, and third managed devices may be similar to, or the same as, any of the managed devices 102-110, described with respect to FIG. 1. The conductor system may be implemented, in some examples, as conductor software (e.g., an app) installed on at least one of the first, second, and/or third managed devices, and/or installed on another device associated with the pairing environment.

At operation 202, communication is established between the conductor system and the first managed device, between the conductor system and the second managed device, and between the conductor system and the third managed device. In examples, the conductor system, first managed device, second managed device, and third managed device are capable of communicating according to a first wireless technology standard, such as Bluetooth or other wireless technology standard, and are further capable of establishing paired connections (e.g., paired connections 114) according to one or more pairing protocols associated with the first wireless technology standard. The conductor system, first managed device, second managed device, and third managed device may also be capable of communicating according to a second wireless technology standard, such as WiFi or other type of wireless networking technology standard (e.g., control connections 116). Communication may be established between the conductor system and each of the first, second and third managed devices through the first and/or second wireless technology standard.

In one example, establishing communication may include one or more of the conductor system, first managed device, second managed device, and/or third managed device entering a discovery or discoverable mode, in which the conductor system, first device, second device, and/or third device may search for, and connect with, each other through the first and/or second wireless technology standards. Establishing communication may further include pairing between the conductor system and one or each of the first, second, and third managed devices, such as by performing a pairing process according to the pairing protocol of the first wireless technology standard. In other examples, establishing communication between the conductor system and the second and/or third managed devices may include performing any of a wide range of methods for establishing wireless communication between devices.

At operation 204, with communication established, the conductor system performs control registration, where the first, second, and third managed devices are registered for pairing management by the conductor system. Control registration may include exchanging cryptographic-key, security, authentication, and/or other types of security credentials used to secure and authenticate the connection between the conductor system and each of the first, second, and third managed devices for pairing management by the conductor system.

Control registration may also include exchanging device-identifying information used for pairing management. For example, the conductor system may exchange primary MAC addresses, BD_ADDRs, or other type of device-identifying information with each of the first, second, and third managed devices. The device-identifying information may be used by the conductor system to communicate with and/or second and third managed devices as part of pairing management.

Control registration further includes determining device profiles supported by the first, second, and third managed devices that may be managed by the conductor system. For example, the first, second, and third managed devices may be configured to allow pairing management of a subset of profiles offered by each of the first, second, and third managed devices. In some examples, the first, second, and/or third managed devices may be configured to allow pairing management of all profiles supported by each of the devices.

At operation 206, the conductor system receives a request to pair the first managed device with the third managed device. The request may be received by any of a variety of methods provided by the conductor system. For example, the conductor system may include a touch-sensitive display that provides a UI for receiving user input and for displaying pairing management information. The UI may include graphical representations of each of the first, second, and third managed devices, and other devices of the pairing environment. The user may request to connect the first managed device to the third managed device by dragging and dropping a graphical representation of the first managed device onto a graphical representation of the third managed device, or vice versa. In other examples, the conductor system may receive the connection request through other types of input to the UI or may receive the request by methods other than UI input.

The request to pair the first managed device with the third managed device may be associated with a subset of profiles supported by the first and third managed devices. For example, the first and third managed devices may support a plurality of profiles for exchanging a wide range of services (e.g., A2DP, AVRCP, HSP, etc.) and the connection request may be associated with only a portion of the supported profiles. In examples where the conductor system provides a UI for receiving the pairing request, the UI may include inputs for selecting one or more profiles to associate with the pairing request.

At operation 208, the conductor system obtains at least one portable MAC address associated with the pairing request. For example, the conductor system may generate a portable MAC address for, or request a portable MAC address from, the first managed device, third managed device, or both managed devices. For example, the conductor system may generate a portable MAC address for the applicable profile for each of the first managed device and the third managed device. In other examples, the first managed device and/or third managed devices may be configured to provide a portable MAC address for each profile or for sets of profiles supported by each of the managed devices. The first and third managed devices may each generate a portable MAC address or may provide a pre-assigned and stored portable MAC address to the conductor system.

In some examples, the conductor system may store the portable MAC addresses of one or more of the managed devices, such as during control registration, as a result of previous connection/pairing requests, or at other times or for other purposes. The conductor system may store the portable MAC addresses in a memory structure as described above, and access the portable MAC addresses as needed for pairing management.

At operation 210, the conductor system may cause the first managed device to be paired with the third managed device. The conductor system may provide the portable MAC address of the first managed device to the third managed device, and may also provide the portable MAC address of the third managed device to the first managed device. In other examples, the conductor system may cause the first managed device and the third managed device to exchange portable MAC addresses for use in pairing directly between the first managed device and the third managed device. The first and third managed devices may use the provided portable MAC addresses to pair with each other per the pairing protocol. In some examples, the conductor system may only provide the portable MAC address of the first managed device to the third managed device, or may only provide the portable MAC address of the third managed device to the first managed device. The managed device receiving the portable MAC address of the other managed device may then initiate and/or complete pairing with the other managed device per the pairing protocol.

Pairing between the first and third managed devices may also include establishing or exchanging security credentials between the first and third managed devices. The security credentials may include one or more security keys, tokens, authentication information, or other types of security credentials that may be used by the first and third devices to authenticate data received through the paired connection. In examples, the first and/or third managed device may make the security credentials available to the conductor system, which may store the security credentials in a memory structure accessible to the conductor system.

Figure 3:
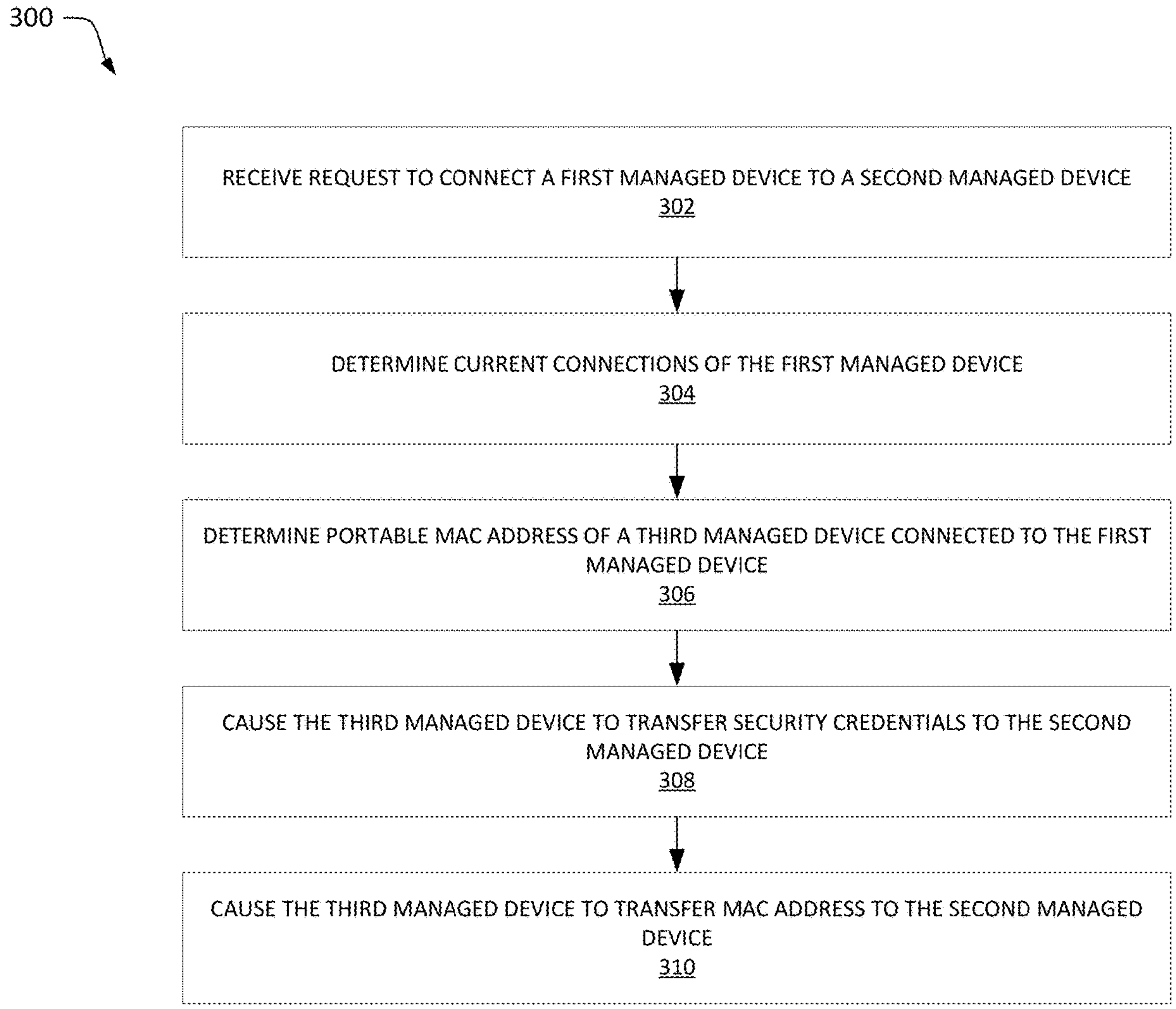
FIG. 3 depicts another example method in which aspects of the present technology may be performed by a conductor system.

FIG. 3 depicts an example method 300 performed by a conductor system for changing the pairing of a first managed device using pairing management as described herein. The example method 300 may be performed within a pairing environment (e.g., pairing environment 100) in which a first managed device, second managed device, and third managed device are configured for pairing management, and are in communication and registered with the conductor system (e.g., conductor 112). A method for establishing communication between a managed device and the conductor system and for performing control registration for pairing management are described above with respect to FIG. 2.

At operation 302, the conductor system receives a request to pair/connect the first managed device to the second managed device. As described above, the request may be received by any of a variety of methods provided by the conductor system. For example, the conductor system may receive user input through a UI, which may include graphical representations of each of the first, second, and third managed devices. The user may request to connect the first managed device to the second managed device by dragging and dropping a graphical representation of the first managed device onto a graphical representation of the second managed device, or vice versa. In examples where the first managed device is currently connected to another managed device (e.g., the third managed device), the first managed device may appear connected to the other managed device, and the user may drag the graphical representation of the first managed device from a graphical representation of the other managed device to a graphical representation of the second managed device. In other examples, the conductor system may receive the connection request through other types of input to the UI, or may receive the request by methods other than UI input.

The request to connect the first managed device to the second managed device may be based on rules configured in any of the conductor system and/or first, second, or third managed devices. For example, the request may be automatically generated by the conductor system, first managed device, second managed device, and/or third managed device based on automatic determination that one or more of the conditions defined in one or more pairing rules are met. As described above, the pairing rules may be based on the time of day; the location of the conductor system and one or more of the first, second, and/or third managed devices; the proximity of any of the conductor system, first managed device, second managed device, and/or third managed device to one another; availability or other state of the conductor system, and/or one or more of the first, second, and/or third managed devices, among other things.

The request to connect the first managed device to the second managed device may be associated with a subset of profiles supported by the first and second devices. For example, the first and second devices may support a plurality of profiles for exchanging a wide range of services (e.g., A2DP, AVRCP, HSP, etc.), and the connection request may be associated with only a portion of the supported profiles.

At operation 304 the conductor system determines current connections/pairings of the first managed device. For instance, the conductor system may determine that the first managed device is connected to the third managed device for a supported profile or subset of supported profiles. The conductor system may determine current connections of the first managed device by communicating with the first managed device to request connection information. In some examples, the conductor system may store connection information associated with one or more of the managed devices, such as in a memory structure provided within the conductor system, provided by another computing device in the pairing environment, provided by a cloud-based device, and/or provided by another computing resource accessible to the conductor system. The conductor system may access the stored connection information to determine current connections of the first managed device.

At operation 306, the conductor system determines the portable MAC address of the third managed device, such as by communicating with the third managed device to request the portable MAC address. The third managed device may include a single portable MAC address for the profiles supported by the third managed device, or may include a portable MAC address for each profile or subset of profiles supported by the third managed device. In some examples, the conductor system may store the portable MAC addresses of one or more of the managed devices, such as during control registration, as a result of previous connection/pairing requests, or at other times. The conductor system may store the portable MAC address in a memory structure as described above, and access the portable MAC address as needed for pairing management.

At operation 308, the conductor system causes the third managed device to transfer security credentials to the second managed device. As described with respect to FIG. 2, the security credentials may include one or more security keys, tokens, authentication information, or other types of security credentials that may be used by the first and third devices to authenticate data received through the paired connection. The second managed device may receive and use the security credentials to maintain the pairing connection with the first managed device.

In some examples, the conductor system may cause the transfer of security credentials from the third to the second managed device by requesting or instructing the second and/or third managed device to perform the transfer. In other examples, the conductor system may have access to the security credentials and may itself provide the security credentials to the second managed device. For instance, the security credentials may be provided to the conductor system during pairing/connection of the first and third devices, and stored in a memory structure accessible to the conductor system as described above. The conductor system may access the stored security credentials as needed, and provide them to managed devices during the process of establishing paired connections.

At operation 310, the conductor system causes the third managed device to transfer the portable MAC address to the second managed device. In some examples, the conductor system may cause the transfer of the portable MAC address from the third to the second managed device by requesting or instructing the second and/or third managed device to perform the transfer. In other examples, the conductor system itself may transfer the portable MAC address from the third to the second managed device.

Following transfer of the security credentials and portable MAC address from the third to the second managed device, the first and second managed devices are paired/connected. The first managed device continues to communicate with an endpoint identified as the portable MAC address previously assigned to the third managed device but seamlessly begins to communicate with the second managed device using the same portable MAC address, which is now assigned to the second managed device. The first and second managed devices may exchange services according to one or more device profiles, in accordance with the protocols of the pairing environment.

Figure 4:
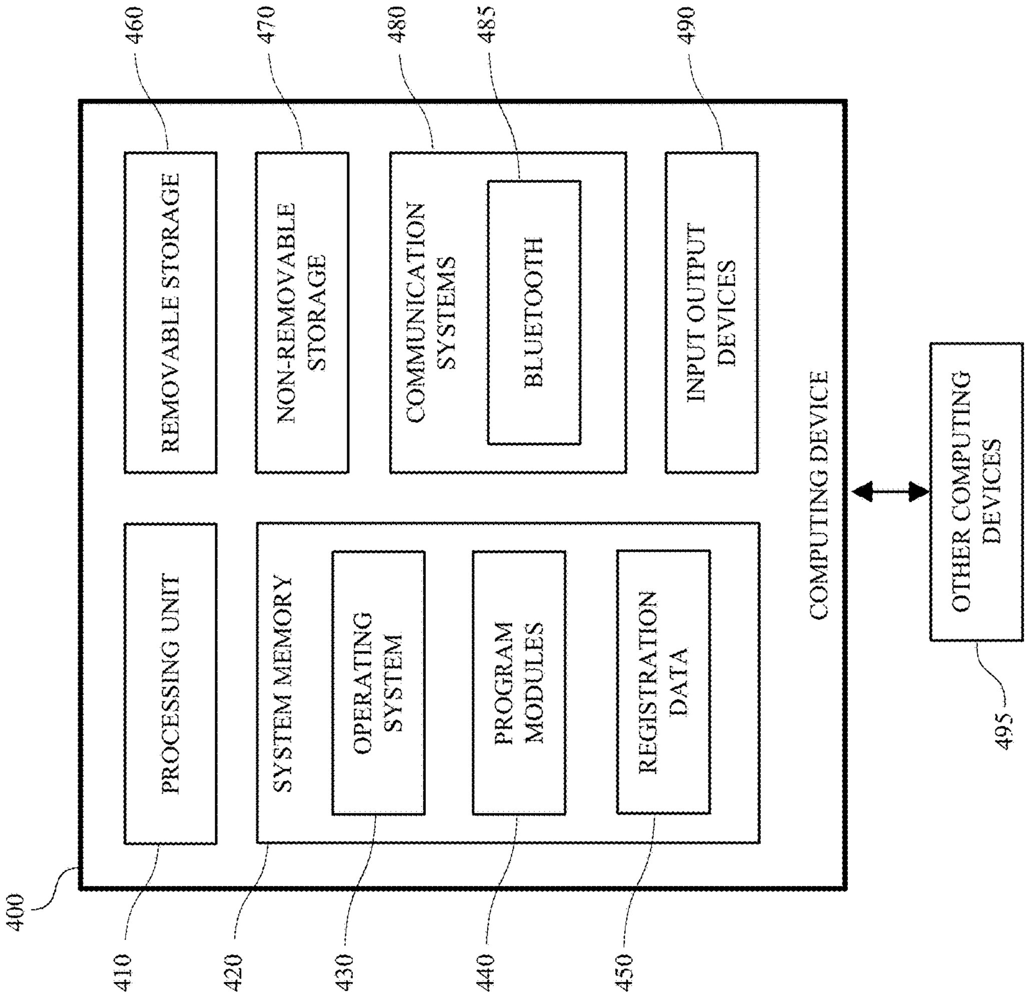
FIG. 4 is a block diagram of an example computing device.

FIG. 4 is a block diagram of an example computing device 400. The computing device 400, or various components and systems of the computing device 400, may be integrated or associated with the first managed device 102, second managed device 104, third managed device 106, proxy device 107, fourth managed device 108, fifth managed device 110, devices/systems associated with the control conductor 112, and/or other elements of the example pairing environment 100. As shown in FIG. 4, the physical components (e.g., hardware) of the computing device are illustrated and these physical components may be used to practice the various aspects of the present disclosure. The elements described above may be implemented via one or more computing devices 400.

The computing device 400 may include at least one processing unit 410 and a system memory 420. The system memory 420 may include, but is not limited to, volatile storage (e.g., random access memory), non-volatile storage (e.g., read-only memory), flash memory, any combination of such memories, and/or other types of memory technology. In some examples, the system memory 420 may also include an operating system 430 that controls the operation of the computing device 400 and one or more program modules 440. In other examples, the computing device 400 may operate or otherwise perform the functions described herein without an operating system 430, such as by program code executed by processor 410 or by other methods.

The program modules 440 may be responsible for gathering or determining registration data 450, including primary MAC addresses, Bluetooth device addresses (BD_ADDRs), portable MAC addresses, and/or other data associated with managed devices with which the computing device 400 may be paired or otherwise connected. A number of different program modules and data files may be stored in the system memory 420. While executing on the processing unit 410, the program modules 440 may perform the various processes described above. For example, the program modules 440 may include one or more software applications that implement a control conductor, such as control conductor 112.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, servers, routers, network devices, client computing devices, etc. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc. For instance, the communication systems 480 may include electronic elements associated with a Bluetooth transceiver 485.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include non-transitory computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media is tangible and non-transitory, and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

In regards to the processes in the flow diagrams of FIGS. 2-3, it should be understood that the sequence of operations of the processes are not fixed, but can be modified, changed in order, performed differently, performed sequentially, concurrently, or simultaneously, or altered into any desired sequence, as recognized by a person of skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure." Also, the term "exemplary" is intended to refer to an example or illustration. As used herein, the terms "use," "using," and "used" may be considered synonymous with the terms "utilize," "utilizing," and "utilized," respectively.

What is claimed is:

1. A method comprising:

receiving, at a conductor system, a request to connect a first managed device to a second managed device using a first protocol;

determining, by the conductor system, that the first managed device is currently connected to a third managed device via a current connection using the first protocol;

determining a first portable media access control (MAC) address used by the third managed device for the current connection to the first managed device; and causing, by the conductor system, the first portable MAC address to be transferred from the third managed device to the second managed device, wherein the first portable MAC address used by the third managed device is generated by the conductor system and provided to the third device.

2. The method of claim 1, further comprising:
causing the third managed device to transfer credentials for the current connection to the second managed device.

3. The method of claim 1, wherein the first protocol is a Bluetooth protocol.

4. The method of claim 1, further comprising:
receiving, at the conductor system, one or more registration for the second managed device and the third managed device to permit transfer of the first portable MAC address.

5. The method of claim 4, wherein the registration includes a profile of the first protocol, and the first portable MAC address is associated by the conductor system with the profile.

6. The method of claim 1, wherein the request comprises a user request received through a user interface of the conductor system.

7. The method of claim 1, wherein the request is automatically generated based on one or more pairing rules implemented by any of the conductor system, first managed device, second managed device, or third managed device.

8. The method of claim 7, wherein the pairing rules are based on one or more of time of day, location of the first managed device, proximity of the first managed device in relation to the second managed device or third managed device, or state of the second managed device or the third managed device.

9. A method comprising:
establishing, by a conductor system, communication with each of a first managed device, a second managed device, and third managed device using a first protocol;
receiving, by the conductor system, registration of the first, second and third managed devices for pairing management;
receiving, at the conductor system, a request to connect the first managed device with the third managed device;
obtaining at least one portable MAC address for the third managed device;
causing the first managed device to pair with the third device using the at least one portable MAC address, wherein pairing is performed according to a second protocol that is different from the first protocol;
receiving, at a conductor system, a request to connect the first managed device to the second managed device; and
causing, by the conductor system, the first portable MAC address to be transferred from the third managed device to the second managed device,
wherein the first portable MAC address used by the third managed device is generated by the conductor system and provided to the third device.

10. The method of claim 9, wherein registering the first, second, and third managed devices with the conductor system includes exchanging security credentials between the conductor system and each of the first, second, and third managed devices.

11. The method of claim 9, wherein registering the first, second, and third managed devices with the conductor system includes receiving, at the conductor system, profile information for each of the first, second, and third managed devices.

12. The method of claim 9, wherein the first protocol is a WiFi protocol, and the second protocol is a Bluetooth protocol.

13. The method of claim 9, wherein the second protocol is a Bluetooth protocol.

14. The method of claim 9, wherein the request is automatically generated based on one or more pairing rules implemented by any of the conductor system, first managed device, or third managed device.

15. A system, comprising:
at least one processor; and
memory, operatively connected to the at least one processor and storing instructions that, when executed by the at least one processor, cause the system to perform a method comprising:
receiving, at a conductor system, a request to connect a first managed device to second managed device using a first protocol;
determining, by the conductor system, that the first managed device is currently connected to a third managed device via a current connection using the first protocol;
determining a first portable media access control (MAC) address used by the third managed device for the current connection to the first managed device; and
causing, by the conductor system, the first portable MAC address to be transferred from the third managed device to the second managed device,
wherein the first portable MAC address used by the third managed device is generated by the conductor system and provided to the third device.

16. The system of claim 15, wherein the first protocol is a Bluetooth protocol.

17. The system of claim 15, further comprising:
receiving, at the conductor system, one or more registration for the second managed device and the third managed device to permit transfer of the first portable MAC address.

18. The system of claim 17, wherein the registration includes a profile of the first protocol, and the first portable MAC address is associated by the conductor system with the profile.

* * * * *